Oct. 30, 1934.  F. J. PARDIECK  1,978,957
SEWER ROD
Filed May 26, 1934
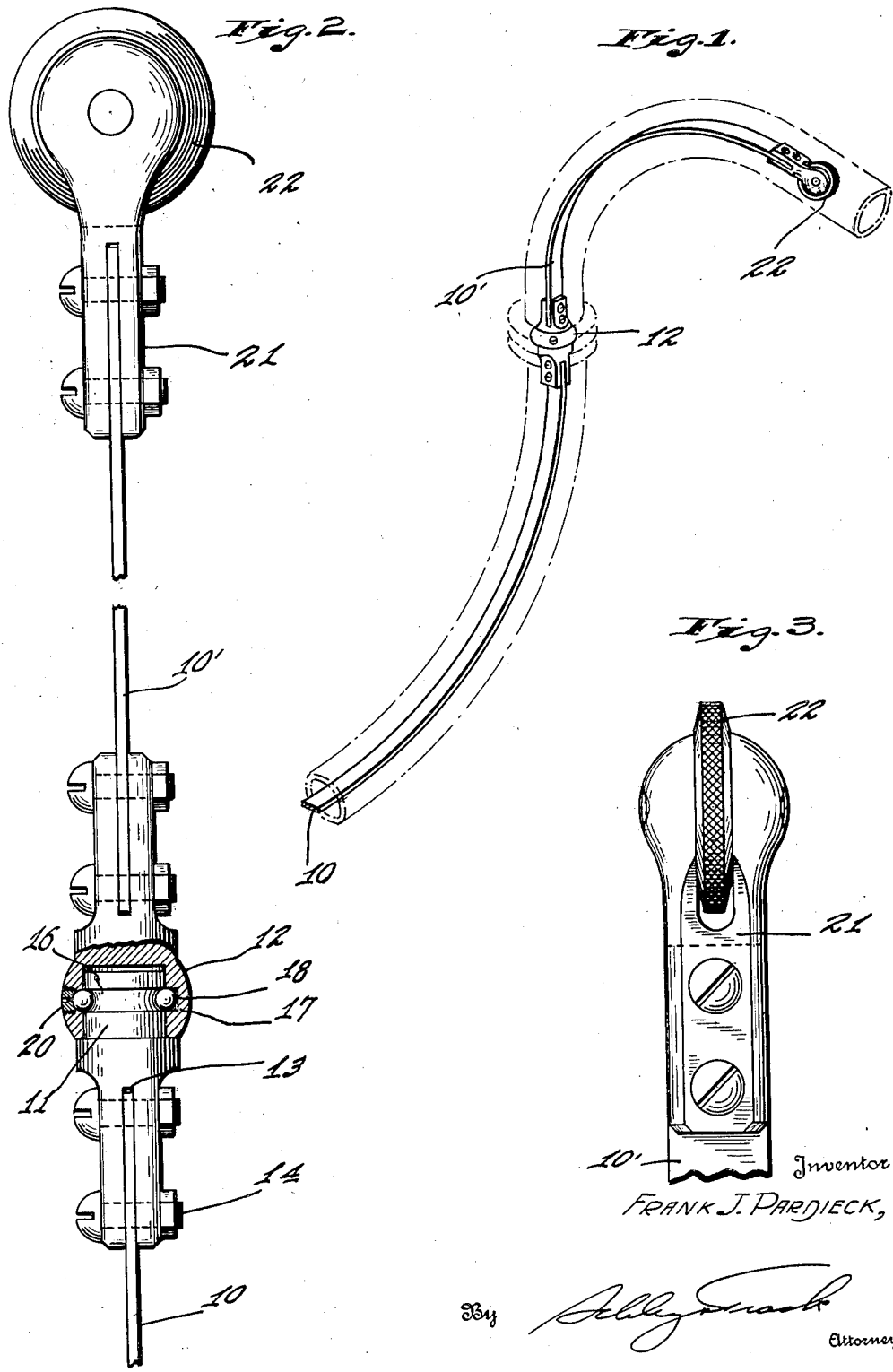
Inventor
FRANK J. PARDIECK,
By
Attorneys Patented Oct. 30, 1934

1,978,957

UNITED STATES PATENT OFFICE 1,978,957

SEWER ROD

Frank J. Pardieck, Indianapolis, Ind.

Application May 26, 1934, Serial No. 727,687

4 Claims. (Cl. 15—104.30)

My invention relates to the removal of obstructions from soil pipes or other conduits. A frequent method of removing such obstructions is through the use of a rod which is thrust through the pipe into contact with the obstruction either to force the obstruction on through the pipe or to break it up. This operation presents no problem when the pipe is straight between the obstruction and the point at which the rod enters the pipe; as a straight rod, sufficiently rigid to transmit the thrust imposed upon it, may be used. However, when the pipe is not straight the rod used must be laterally flexible so that it can follow the bends in the pipe; and such flexibility obviously interferes with the imposition of an adequate thrust on the obstruction; for in transmitting such thrust the rod acts as a column.

It is the object of my invention to produce a pipe-cleaning rod which will be as capable of transmitting thrust as any prior rod of which I am aware and, at the same time, will be more effectively flexible than prior rods.

In carrying out my invention, I construct the rod of a plurality of sections each of which is much more flexible in one longitudinal plane than in the other. Preferably, only two sections are employed—a main section, which may have any desired length, and a leading section usually only three or four feet long. The sections of the rod are interconnected by means of a swivel joint permitting relative rotation of adjacent rod sections about a generally longitudinal axis in order to permit relative angular displacement of the planes of maximum flexibility of the rod-sections.

The accompanying drawing illustrates my invention: Fig. 1 is an isometric view showing the assembled rod following a curved pipe; Fig. 2 is a side elevation of the rod with parts of one of the joints broken away to illustrate details of construction; and Fig. 3 is an elevation of the head with which the front end of the leading section is preferably provided.

The main section 10 of the rod is conveniently a strip of steel of rectangular cross-section. In one rod which has proven highly satisfactory in use, the section 10 has a thickness of $\frac{3}{32}$ inch and a width of $\frac{7}{8}$ inch. Its length should obviously be great enough to enable the complete rod to extend through the section of pipe which is to be cleaned.

The leading section 10' of the rod may be made of the same material as that used for the main section. A convenient length for the leading section is, as indicated above, about three or four feet.

As previously indicated, the sections of the rod are interconnected through swivel joints providing for relative rotation of the rod-sections on a generally longitudinal axis. A preferred form of joint is illustrated in Fig. 2. It comprises an inner coupling member 11 and an outer coupling member 12, the former having its outer end circular in cross-section, and the latter being provided with an axial recess adapted to rotatably receive such circular end. The coupling members are adapted for respective connection to the rod-sections 10 and 10', as by being provided with longitudinally extending slots 13 having a width equal to the thickness of the rod-sections. Bolts 14 extending through each coupling member and across the slot 13 through holes in the end of the associated rod-section operate to hold the rod-section in place in the slot.

In order to prevent axial separation of the two coupling members, their inner engaging cylindrical surfaces may be provided respectively with coplanar annular grooves 16 and 17. Such two grooves, when alined, provide an annular channel in which I place a series of spherical members such as the hardened steel balls 18. These balls 18 are put in place after the two coupling members 11 and 12 are assembled, the balls conveniently being fed successively through a hole in the wall of the coupling member 12. After the annular channel formed by the grooves 16 and 17 has been filled with the balls 18, this hole is closed, as by means of a screwthreaded plug 20.

The leading section 10' of the rod has mounted on its front end a device adapted to cause the rod to follow a pipe as it is pushed therethrough. Conveniently, this means takes the form of a head 21 which is mounted rigidly on the end of the rod-section and which rotatably supports a guide wheel 22 which projects both forwardly and laterally beyond the limits of the head 21 to engage the inner surface of the pipe. The wheel 22 should be mounted in the plane of maximum flexibility of the rod section to which the head 21 is secured.

In using the rod, it is fed longitudinally into a pipe to be cleaned. When the head end of the rod encounters a bend in the pipe, the wheel 22 follows the outer wall of the bend and causes the leading rod-section to be flexed in order that it may pass through the bend in the pipe. Whenever resistance owing to the curvature of the pipe is encountered, the action of the wheel 22 causes the leading rod-section 10' to turn about its axis until its plane of maximum flexibility coincides with the plane of the pipe-bend. This rotation of the leading rod-section 10' about its own axis is facilitated by working the rod back and forth through a short distance whenever resistance is encountered.

Since each section of a rod embodying my invention is relatively rigid in one plane, it is possible to obtain a greater effective thrust against an obstruction than can be obtained with rods of uniform flexibility in all longitudinal planes. The swivel joint between the rod sections permits the leading section 10' to assume, without substantial resistance, a position in which its plane of maximum flexibility coincides with the plane of a pipe-bend to be entered, thus making it possible for the rod to pass through two pipe-bends which are of different planes and close together, as indicated in Fig. 1. The main section 10 of the rod, being guided by the leading section, will twist to follow two such non-coplanar pipe-bends as illustrated in Fig. 1.

I claim as my invention:

1. A sewer-rod, comprising a main section and a leading section, each of said sections being relatively flexible in one longitudinal plane and relatively rigid in the longitudinal plane perpendicular to the plane of flexibility, swivel means interconnecting said two rod-sections for relative rotation about an axis disposed generally longitudinally of the rod, and a guiding head carried by said leading section.

2. In a sewer-rod, two sections, each being more flexible in one longitudinal plane than in others, and swivel means interconnecting said two rod-sections for relative rotation about an axis disposed generally longitudinally of the rod.

3. A sewer-rod, comprising a main section of rectangular cross-section, one cross-sectional dimension being materially larger than the other, said rod-section being flexible in planes extending longitudinally of the rod and parallel to its smaller cross-sectional dimension, a leading section of similar cross-section and similarly flexible, single-axis swivel means interconnecting said two rod-sections for relative rotation about an axis disposed generally longitudinally of the rod, and a guiding head carried by said leading section.

4. In a sewer-rod, two sections, each being of rectangular cross-section with one dimension materially larger than the other, and each section being flexible in planes extending longitudinally of the rod and parallel to the smaller cross-sectional dimension of such section, and swivel means interconnecting said two rod-sections for relative rotation about an axis disposed generally longitudinally of the rod.

FRANK J. PARDIECK.